Oct. 2, 1934.   G. SANFILIPPO   1,975,435
AUTOMOBILE AND TRUCK TOWING MECHANISM
Filed Aug. 15, 1933   2 Sheets-Sheet 2
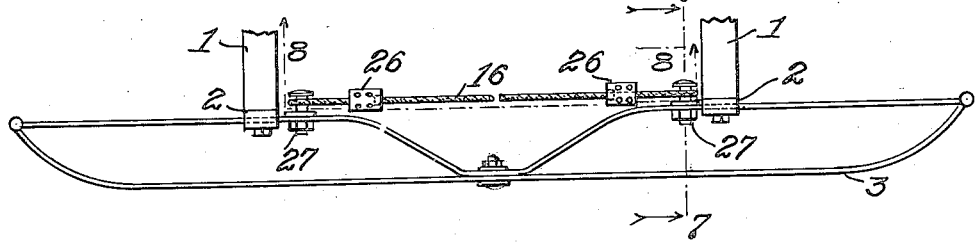
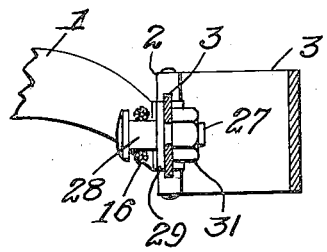
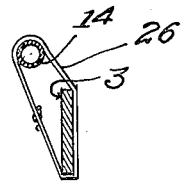
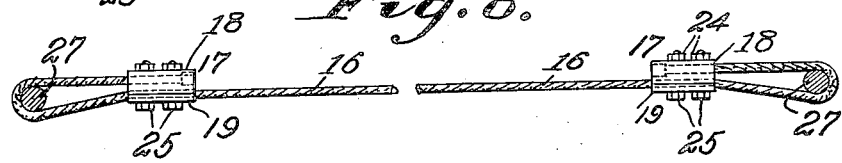
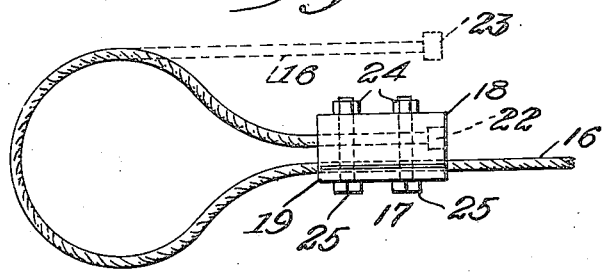
INVENTOR,
Gaetano Sanfilippo.
BY
E. E. Vrooman & Co.,
His ATTORNEYS.

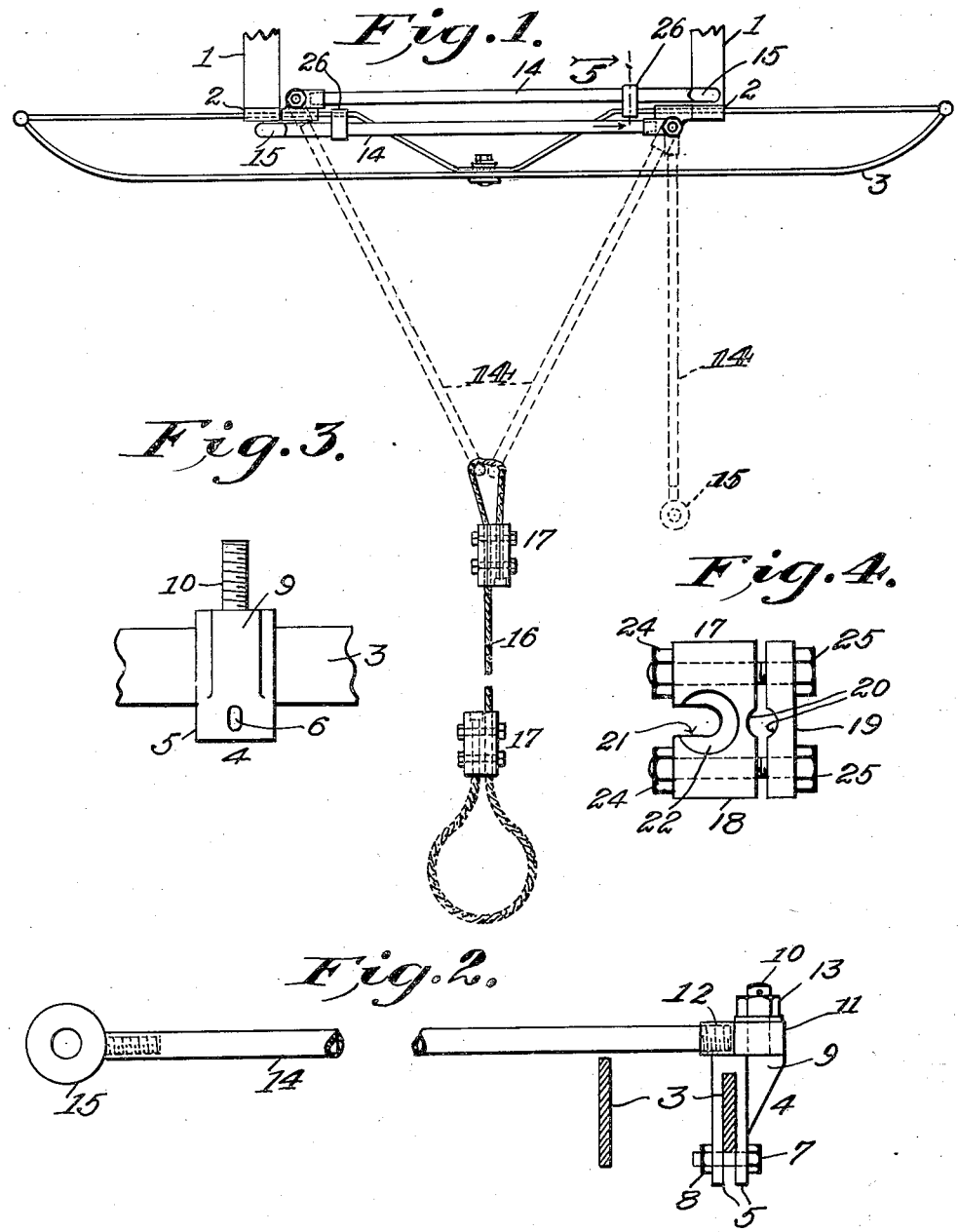

Patented Oct. 2, 1934

1,975,435

UNITED STATES PATENT OFFICE 1,975,435

AUTOMOBILE AND TRUCK TOWING MECHANISM

Gaetano Sanfilippo, East Chicago, Ind.

Application August 15, 1933, Serial No. 685,262

2 Claims. (Cl. 280—33.14)

This invention relates to an automobile and truck towing mechanism.

An object of the invention is the construction of a simple and efficient towing mechanism which can be easily attached to the bumper of a motor vehicle.

Another object of the invention is the construction of an efficient towing mechanism that can be folded out of the way, when not in use, but which can be quickly set for use when the operator desires.

A still further object of the invention is the construction of a towing mechanism in which a novel arrangement of folding units is employed, and to which units is applied a towing cable device, when the mechanism is adjusted or set for operation.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a top plan view of the mechanism showing the rods in a folded position.

Figure 2 is an enlarged fragmentary side view of one of the rods, in the extended position, showing the bumper, on which it is mounted, in transverse section.

Figure 3 is an enlarged view in elevation of one of the bracket devices.

Figure 4 is an enlarged front view of one of the clamp devices.

Figure 5 is an enlarged sectional view taken on line 5, looking in the direction of the arrows.

Figure 6 is a top plan view of a bumper showing the towing cable device mounted directly thereon.

Figure 7 is an enlarged sectional view taken on line 7—7, Fig. 6 and looking in the direction of the arrows.

Figure 8 is an enlarged sectional view taken on line 8—8, Fig. 6 and looking in the direction of the arrows.

Figure 9 is an enlarged fragmentary view, in elevation, of the towing cable device, showing a clamp device in side elevation.

Referring to the drawings by numerals, 1 designates the frame of an automobile or motor vehicle carrying the usual bumper holders 2, 2. The bumper 3, whether it be the front or rear bumper, is mounted on bumper holders 2 in the usual manner.

Two similarly constructed bracket devices 4 are mounted on the inner part of the bumper 3, and it will only be necessary to specifically describe one to understand the structure of the two. The bracket device comprises a bifurcated body 5 that straddles a part of the bumper 3, as clearly seen in Fig. 2. In the lower part of the body 5 are elongated registering apertures 6, Fig. 3. In these apertures 6 is placed bolt 7, with nut 8, for holding the body securely on the bumper. Integral with and extending outwardly from body 5 is a large shoulder 9; this shoulder 9 has integral with its upper end, an upstanding stud bolt 10. On bolt 10 is rotatably mounted a collar 11. The collar 11 is provided with an integral internally threaded sleeve 12. A nut 13 serves to hold the collar 11 on the stud bolt 10. A towing rod 14 is threaded at one end into sleeve 12, Fig. 2, and its other end has an eye bolt 15 threaded into same. I use the term "rod" in a broad sense, meaning any suitable element that will have sufficient strength and the essential construction, as the specific hollow rod, shown and described.

The outer rod in Fig. 1 swings outwardly, above the bumper 3, as indicated by dotted lines. The inner rod also swings outwardly, as indicated by dotted lines. However, the two rods with their eye-bolts registering, are brought together, when the towing operation is to take place, with the looped inner end of the towing cable 16 threaded through the eye-bolts, Fig. 1.

The towing cable device comprises the towing cable 16 on which is mounted two clamp devices 17. As these devices are similarly constructed, I will only specifically describe one. The clamp device comprises a primary plate 18 and an auxiliary plate 19. On the contiguous faces of the primary and auxiliary plates, I form registering grooves 20, through which the towing cable 16 extends. On the outer face of the primary plate 18, and extending longitudinally thereof, is a towing cable receiving socket 21, which is provided at its outer end with a stop key socket 22; this socket 22 is larger in diameter than socket 21, for receiving the stop key 23, fixedly fastened to the end of the towing cable 16; in fact, the cable 16 has a key 23 at each of its ends. Upon loosening nuts 24, on bolts 25, the operator can adjust the towing cable in the clamp device to secure the desired size loop, then when the loop is adjusted to the satisfactory size by tightening the nuts 24, the loop will be retained in its fixed size until the operator again adjusts the same. It is to be noted that the end of the cable 16 is laid down in the receiving socket 21, with the stop key 23 in the socket 22.

The towing cable device constitutes the necessary attaching means of my towing mechanism, whereas the brackets 4 and towing rods 14 constitute the necessary attaching means for attaching the towing cable device to the bumper of the vehicle.

To retain the rods 14 in a folded position, as shown in Fig. 1, I employ preferably flexible straps 26. These straps are of any ordinary structure, whereby they can be quickly manipulated for releasing the rods 14 when they are to be moved outwardly to their operative position.

Without changing the principle of construction of the brackets 4, the inner bracket, carrying the inner rod 14 can be slightly lengthened to raise the rod 14 sufficiently above the front rod, so that the outer end of the inner rod, will clear the bracket structure carrying the outer rod. Then when the two rods are extended, as shown by dotted lines, Fig. 1, they can be brought together so that the eye-bolts 15 will register for receiving the towing cable 16.

In Fig. 6, I have shown two bracket bolts 27, placed on the rear part of the bumper 3. Each bolt 27 (Fig. 7) comprises a body 28 around which the looped end of the towing cable 16 passes; this body 28 has a flange or integral washer 29 at its inner end, with head 30 on its outer end. A nut 31 is placed on bolt 27, for securely fastening the bolt on the bumper 3. The towing cable device can be placed on the bracket bolts, as shown in Figure 6, and by releasing one end, and leaving the other end on the bracket bolt, the towing cable can be hooked or fastened to another vehicle for towing purposes. It is to be noted that the bracket bolt 27 constitutes means for attaching the towing cable to a bumper or generically speaking, a motor vehicle. When using the towing cable device as a necessary part of my preferred embodiment shown in Fig. 1, when it is not in use, it may be stored on the vehicle in any suitable manner.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a mechanism of the class described, the combination with a bumper, of a pair of vertical bracket devices on said bumper, each bracket device comprising a bifurcated body straddling a portion of said bumper and extending below same, said bifurcated body provided below the bumper and near its lower edge with elongated registering apertures, a bolt in said registering apertures for securing the bracket device on said bumper, an integral outwardly extending enlarged shoulder on one side of said bifurcated body, said shoulder provided at its top with an upstanding threaded stud bolt, rods pivotally mounted on said stud bolts, nuts on the upper end of said stud bolts and against said rod, and means for attaching said rods to a towing vehicle.

2. In a mechanism of the class described, the combination with a bumper, of bracket devices on said bumper, each bracket device provided with a stud bolt, a collar on each stud bolt, said collar provided with a sleeve, a towing rod extending at one end into said sleeve, an eye-bolt extending into the outer end of said towing rod, and means for attaching said eye-bolts to a towing means or vehicle.

GAETANO SANFILIPPO.